US011509933B2

(12) United States Patent
Pesonen et al.

(10) Patent No.: US 11,509,933 B2
(45) Date of Patent: Nov. 22, 2022

(54) METHOD, AN APPARATUS AND A COMPUTER PROGRAM PRODUCT FOR VOLUMETRIC VIDEO

(71) Applicant: Nokia Technologies Oy, Espoo (FI)

(72) Inventors: Mika Pesonen, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/275,482

(22) PCT Filed: Sep. 10, 2019

(86) PCT No.: PCT/FI2019/050647
§ 371 (c)(1),
(2) Date: Mar. 11, 2021

(87) PCT Pub. No.: WO2020/053482
PCT Pub. Date: Mar. 19, 2020

(65) Prior Publication Data

US 2022/0116659 A1 Apr. 14, 2022

(30) Foreign Application Priority Data

Sep. 13, 2018 (FI) ..................................... 20185762

(51) Int. Cl.
*H04N 19/597* (2014.01)
*H04N 19/159* (2014.01)
*H04N 19/176* (2014.01)

(52) U.S. Cl.
CPC ......... *H04N 19/597* (2014.11); *H04N 19/159* (2014.11); *H04N 19/176* (2014.11)

(58) Field of Classification Search
CPC .. H04N 19/597; H04N 19/159; H04N 19/176; H04N 13/161; H04N 19/70
See application file for complete search history.

(56) References Cited

U.S. PATENT DOCUMENTS

2009/0232206 A1* 9/2009 Boon ................... H04N 19/136 375/E7.243
2015/0379681 A1 12/2015 Akenine-moller et al.
(Continued)

FOREIGN PATENT DOCUMENTS

WO 2019/185985 A1 10/2019

OTHER PUBLICATIONS

Office action received for corresponding Finnish Patent Application No. 20185762, dated Apr. 11, 2019, 9 pages.
(Continued)

*Primary Examiner* — Tat C Chio
(74) *Attorney, Agent, or Firm* — Joseph C. Drish; Harrington & Smith

(57) ABSTRACT

The embodiments relate to a method comprising receiving (1311) a volumetric video comprising a three-dimensional object; segmenting (1312) the three-dimensional object into a plurality of regions; for one or more regions of a three-dimensional object (1313): inserting into a bitstream or signaling along a bitstream a signal indicating one or more of the following: intra frame offset relating to three-dimensional geometry value (Z) between two regions within a frame; inter frame offset relating to three-dimensional geometry value (Z) between two regions in different frames; depth smoothness constraint relating to three-dimensional geometry value (Z) and transmitting (1314) the bitstream to a decoder. The embodiments relate to a method for receiving and decoding the bitstream, as well as to technical equipment for implementing any of the methods.

25 Claims, 14 Drawing Sheets

(56) References Cited

U.S. PATENT DOCUMENTS

| | | | | |
|---|---|---|---|---|
| 2017/0347100 | A1* | 11/2017 | Chou | H03M 7/3059 |
| 2017/0358092 | A1 | 12/2017 | Bleibel et al. | |
| 2019/0311502 | A1* | 10/2019 | Mammou | G01S 17/89 |
| 2021/0243455 | A1* | 8/2021 | Rapaka | H04N 19/103 |

OTHER PUBLICATIONS

Zakharchenko, "Algorithm Description of mpeg-pcc-tmc2", ISO/IEC JTC1/SC29/WG11 MPEG2018/N17526, 3DG, Apr. 2018, 13 pages.
International Search Report and Written Opinion received for corresponding Patent Cooperation Treaty Application No. PCT/FI2019/050647, dated Dec. 4, 2019, 16 pages.
Schwarz et al., "2D Video Coding of Volumetric Video Data", Picture Coding Symposium (PCS), Jun. 24-28, 2018, pp. 61-65.
Zhang, Dejun, "A new patch side information encoding method for PCC TMC2", Huawei Technologies, ISO/IEC JTC1/SC29/WG11 MPEG2018/M42195, Jan. 2018, 4 pages.
Schwarz, Sebastian, et al., "Patch metadata for 3D location relationship in PCC TMC2", Nokia Technologies, ISO/IEC JTC1/SC29/WG11 MPEG2018/M43483, Jul. 2018, 2 pages.
Pesonen, Mika, et al., "Contour Based Occupancy Coding", Nokia Technologies, ISO/IEC JTC1/SC29/WG11 MPEG 2016/M42491, Apr. 2016, 9 pages.

* cited by examiner

METHOD, AN APPARATUS AND A COMPUTER PROGRAM PRODUCT FOR VOLUMETRIC VIDEO

RELATED APPLICATION

This application claims priority to PCT Application No. PCT/FI2019/050647, filed on Sep. 10, 2019, which claims priority to Finland Application No. 20185762, filed on Sep. 13, 2018, each of which is incorporated herein by reference in its entirety.

TECHNICAL FIELD

The present invention relates to an apparatus, a method and a computer program for volumetric video coding and decoding.

BACKGROUND

Since the beginning of photography and cinematography, the most common type of image and video content has been captured by cameras with relatively narrow field of view and displayed as a rectangular scene on flat displays. The cameras are mainly directional, whereby they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

For volumetric video, a scene may be captured using one or more 3D (three-dimensional) cameras. The cameras are in different positions and orientations within a scene. One issue to consider is that compared to 2D (two-dimensional) video content, volumetric 3D video content has much more data, so viewing it requires lots of bandwidth (with or without transferring it from a storage location to a viewing device): disk I/O, network traffic, memory bandwidth, GPU (Graphics Processing Unit) upload. Capturing volumetric content also produces a lot of data, particularly when there are multiple capture devices used in parallel.

SUMMARY

Now there has been invented a method and technical equipment implementing the method, for providing an improvement for volumetric video coding. Various aspects of the invention include a method, an apparatus, and a computer readable medium comprising a computer program stored therein, which are characterized by what is stated in the independent claims. Various embodiments of the invention are disclosed in the dependent claims.

According to a first aspect, there is provided a method comprising receiving a volumetric video comprising a three-dimensional object; segmenting the three-dimensional object into a plurality of regions; for one or more regions of a three-dimensional object: inserting into a bitstream or signaling along a bitstream a signal indicating one or more of the following: intra frame offset relating to three-dimensional geometry value (Z) between two regions within a frame; inter frame offset relating to three-dimensional geometry value (Z) between two regions in different frames; depth smoothness constraint relating to three-dimensional geometry value (Z); and transmitting the bitstream to a decoder.

According to a second aspect, there is provided an apparatus comprising at least one processor, memory including computer program code, wherein memory and the computer program code are configured to, with the at least one processor, cause the apparatus to receive a volumetric video comprising a three-dimensional object; segment the three-dimensional object into a plurality of regions; for one or more regions of a three-dimensional object: insert into a bitstream or signaling along a bitstream a signal indicating one or more of the following: intra frame offset relating to three-dimensional geometry value (Z) between two regions within a frame; inter frame offset relating to three-dimensional geometry value (Z) between two regions in different frames; depth smoothness constraint relating to three-dimensional geometry value (Z); and transmit the bitstream to a decoder.

According to a third aspect, there is provided an apparatus comprising means for receiving a volumetric video comprising a three-dimensional object; means for segmenting the three-dimensional object into a plurality of regions; for one or more regions of a three-dimensional object: means for inserting into a bitstream or signaling along a bitstream a signal indicating one or more of the following: intra frame offset relating to three-dimensional geometry value (Z) between two regions within a frame; inter frame offset relating to three-dimensional geometry value (Z) between two regions in different frames; depth smoothness constraint relating to three-dimensional geometry value (Z); and means for transmitting the bitstream to a decoder.

According to an embodiment, the intra frame offset relating to three-dimensional geometry value (Z) with respect to another region of the same frame is inserted into the bitstream.

According to an embodiment, the intra frame offset between two regions is determined by comparing a region to other patches located on the left and/or top of the region.

According to an embodiment, a region with lowest difference signaling cost is selected for calculation of the intra frame offset.

According to an embodiment, a region is a patch or a block.

According to an embodiment, the inter frame offset relating to three-dimensional geometry value is determined between patches in temporally consecutive geometry images.

According to an embodiment, the inter frame offset is determined by comparing a patch to a respective location in a reference geometry image used for temporal prediction.

According to an embodiment, the patches for the inter frame offset are selected according to their similarity with respect to a three-dimensional distance, three-dimensional location, or dimensions of the temporal consecutive patches.

According to a fourth aspect, there is provided a method comprising receiving a bitstream; decoding from a bitstream a signal indicating at least one of the following: intra frame offset relating to three-dimensional geometry value (Z) between two regions within a frame; inter frame offset relating to three-dimensional geometry value (Z) between two patches in different frames; depth smoothness constraint relating to three-dimensional geometry value (Z); and reconstructing a volumetric video by adjusting geometry region values according to the decoded information.

According to a fifth aspect, there is provided an apparatus comprising at least one processor, memory including computer program code, wherein memory and the computer program code are configured to, with the at least one processor, cause the apparatus to receive a bitstream; decode from a bitstream a signal indicating at least one of the following: intra frame offset relating to three-dimensional geometry value (Z) between two regions within a frame; inter frame offset relating to three-dimensional geometry value (Z) between two patches in different frames; depth smoothness constraint relating to three-dimensional geometry value (Z); and reconstruct a volumetric video by adjusting geometry region values according to the decoded information.

According to a sixth aspect, there is provided an apparatus comprising means for receiving a bitstream; means for decoding from a bitstream a signal indicating at least one of the following: intra frame offset relating to three-dimensional geometry value (Z) between two regions within a frame; inter frame offset relating to three-dimensional geometry value (Z) between two patches in different frames; depth smoothness constraint relating to three-dimensional geometry value (Z); and means for reconstructing a volumetric video by adjusting geometry region values according to the decoded information.

DESCRIPTION OF THE DRAWINGS

In the following, various embodiments will be described in more detail with reference to the appended drawings, in which.

DESCRIPTION OF EXAMPLE EMBODIMENTS

Figure 1:
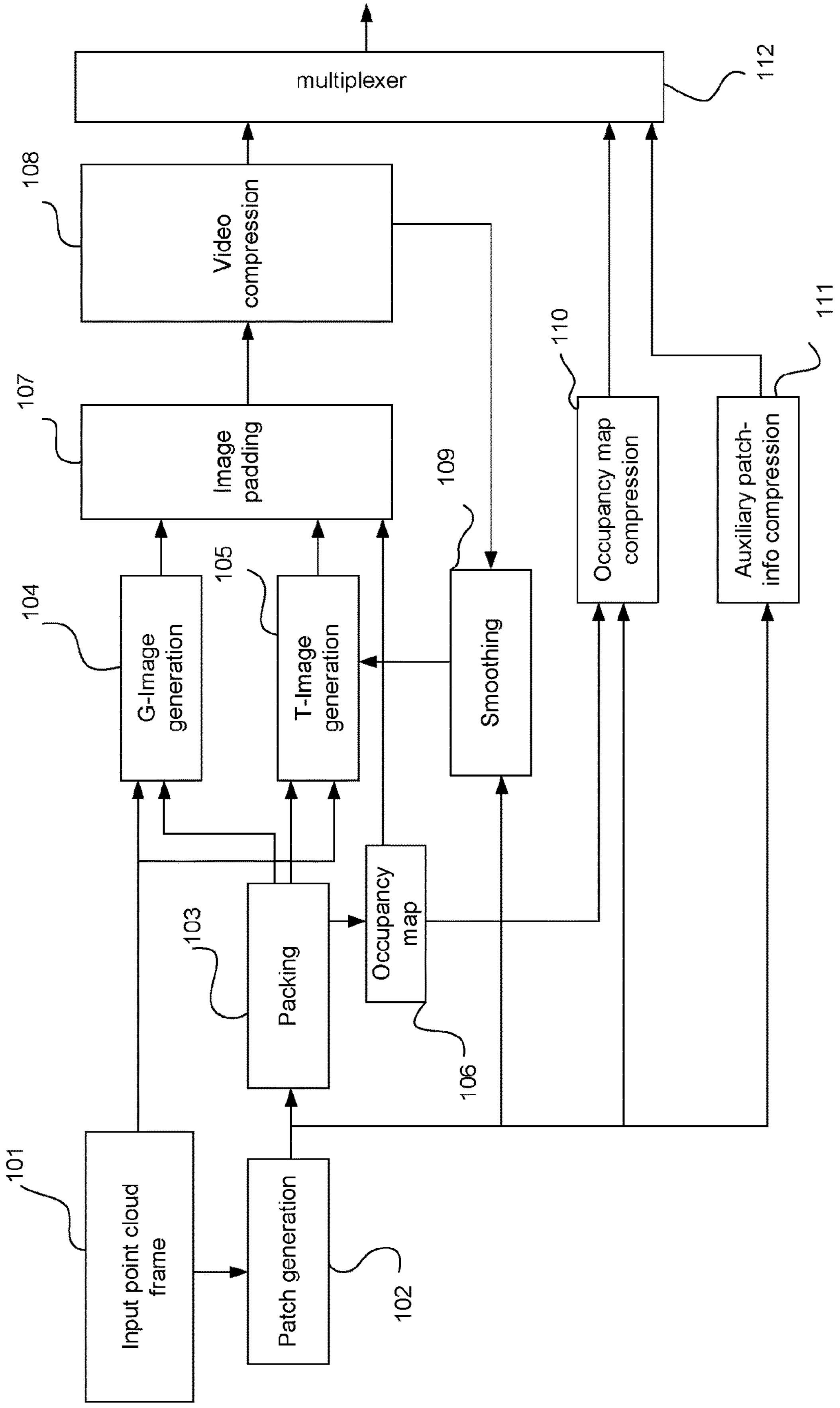
FIG. 1 shows an example of a volumetric video compression process.

In the following, several embodiments will be described in the context of volumetric video coding. In particular, the present embodiments relate to temporal aligned depth planes for projected volumetric video.

A video codec comprises an encoder that transforms the input video into a compressed representation suited for storage/transmission, and a decoder that can un-compress the compressed video representation back into a viewable form. An encoder may discard some information in the original video sequence in order to represent the video in a more compact form (i.e. at lower bitrate).

Volumetric video may be captured using one or more three-dimensional (3D) cameras. When multiple cameras are in use, the captured footage is synchronized so that the cameras provide different viewpoints to the same world. In contrast to traditional 2D/3D video, volumetric video describes a 3D model of the world where the viewer is free to move and observer different parts of the world.

Volumetric video enables the viewer to move in six degrees of freedom (6DOF): in contrast to common 360° video, where the user has from 2 to 3 degrees of freedom (yaw, pitch, and possibly roll), a volumetric video represents a 3D volume of space rather than a flat image plane. Volumetric video frames contain a large amount of data because they model the contents of a 3D volume instead of just a two-dimensional (2D) plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstruction techniques such as structure from motion, or captured with a combination of cameras and depth sensors such as LiDAR (Light Detection and Ranging), for example.

Volumetric video data represents a three-dimensional scene or object, and thus such data can be viewed from any viewpoint. Volumetric video data can be used as an input for augmented reality (AR), virtual reality (VR) and mixed reality (MR) applications. Such data describes geometry (shape, size, position in 3D-space) and respective attributes (e.g. color, opacity, reflectance, . . . ), together with any possible temporal changes of the geometry and attributes at given time instances (e.g. frames in 2D video). Volumetric video is either generated from 3D models, i.e. computer-generated imagery (CGI), or captured from real-world scenes using a variety of capture solutions, e.g. a multi-camera, a laser scan, a combination of video and dedicated depths sensors, etc. Also, a combination of CGI and real-world data is possible. Examples of representation formats for such volumetric data are triangle meshes, point clouds, or voxel. Temporal information about the scene can be included in the form of individual capture instances, i.e. "frames" in 2D video, or other means, e.g. position of an object as a function of time.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications, such as capturing real world 3D scenes where the topology is not necessarily a 2D manifold. Another way to represent 3D data is coding this 3D data as a set of texture and depth map as is the case in the multi-view plus depth. Closely related to the techniques used in multiview plus depth is the use of elevation maps, and multi-level surface maps.

In 3D point clouds, each point of each 3D surface is described as a 3D point with color and/or other attribute information such as surface normal or material reflectance. Point cloud is a set of data points in a coordinate system, for example in a three-dimensional coordinate system being defined by X, Y, and Z coordinates. The points may represent an external surface of an object in the screen space, e.g. in a three-dimensional space.

In dense point clouds or voxel arrays, the reconstructed 3D scene may contain tens or even hundreds of millions of points. If such representations are to be stored or interchanged between entities, then efficient compression of the presentations becomes fundamental. Standard volumetric video representation formats, such as point clouds, meshes, voxel, suffer from poor temporal compression performance. Identifying correspondences for motion-compensation in 3D-space is an ill-defined problem, as both, geometry and respective attributes may change. For example, temporal successive “frames” do not necessarily have the same number of meshes, points or voxel. Therefore, compression of dynamic 3D scenes is inefficient. 2D-video based approaches for compressing volumetric data, i.e. multiview with depth, have much better compression efficiency, but rarely cover the full scene. Therefore, they provide only limited 6DOF capabilities.

Instead of the above-mentioned approach, a 3D scene, represented as meshes, points, and/or voxel, can be projected onto one, or more, geometries. These geometries may be “unfolded” or packed onto 2D planes (two planes per geometry: one for texture, one for depth), which are then encoded using standard 2D video compression technologies. Relevant projection geometry information may be transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency can be increased greatly. Using geometry-projections instead of 2D-video based approaches based on multiview and depth, provides a better coverage of the scene (or object). Thus, 6DOF capabilities are improved. Using several geometries for individual objects improves the coverage of the scene further. Furthermore, standard video encoding hardware can be utilized for real-time compression/decompression of the projected planes. The projection and the reverse projection steps are of low complexity.

FIG. 1 illustrates an overview of an example of a compression process. Such process may be applied for example in MPEG Point Cloud Coding (PCC). The process starts with an input point cloud frame 101 that is provided for patch generation 102, geometry image generation 104 and texture image generation 105.

The patch generation 102 process aims at decomposing the point cloud into a minimum number of patches with smooth boundaries, while also minimizing the reconstruction error. For patch generation, the normal at every point can be estimated. An initial clustering of the point cloud can then be obtained by associating each point with one of the following six oriented planes, defined by their normals:

(1.0, 0.0, 0.0),
(0.0, 1.0, 0.0),
(0.0, 0.0, 1.0),
(−1.0, 0.0, 0.0),
(0.0, −1.0, 0.0), and
(0.0, 0.0, −1.0)

More precisely, each point may be associated with the plane that has the closest normal (i.e. maximizes the dot product of the point normal and the plane normal).

The initial clustering may then be refined by iteratively updating the cluster index associated with each point based on its normal and the cluster indices of its nearest neighbors. The final step may comprise extracting patches by applying a connected component extraction procedure.

Patch info determined at patch generation 102 for the input point cloud frame 101 is delivered to packing process 103, to geometry image generation 104 and to texture image generation 105. The packing process 103 aims at mapping the extracted patches onto a 2D plane, while trying to minimize the unused space, and guaranteeing that every T×T (e.g. 16×16) block of the grid is associated with a unique patch. It should be noticed that T may be a user-defined parameter. Parameter T may be encoded in the bitstream and sent to the decoder.

The used simple packing strategy iteratively tries to insert patches into a W×H grid. W and H may be user-defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch, then the height H of the grid is temporarily doubled, and search is applied again. At the end of the process, H is clipped so as to fit the used grid cells.

The geometry image generation 104 and the texture image generation 105 are configured to generate geometry images and texture images respectively. The image generation process may exploit the 3D to 2D mapping computed during the packing process to store the geometry and texture of the point cloud as images. In order to better handle the case of multiple points being projected to the same pixel, each patch may be projected onto two images, referred to as layers. For example, let H(u, y) be the set of points of the current patch that get projected to the same pixel (u, v). The first layer, also called a near layer, stores the point of H(u, v) with the lowest depth D0. The second layer, referred to as the far layer, captures the point of H(u, v) with the highest depth within the interval [D0, D0+Δ], where Δ is a user-defined parameter that describes the surface thickness. The generated videos may have the following characteristics:

Geometry: W×H YUV420-8 bit,

Texture: W×H YUV420-8 bit,

It is to be noticed that the geometry video is monochromatic. In addition, the texture generation procedure exploits the reconstructed/smoothed geometry in order to compute the colors to be associated with the re-sampled points.

The geometry images and the texture images may be provided to image padding 107. The image padding 107 may also receive as an input an occupancy map (OM) 106 to be used with the geometry images and texture images. The occupancy map 106 may comprise a binary map that indicates for each cell of the grid whether it belongs to the empty space or to the point cloud. In other words, the occupancy map (OM) may be a binary image of binary values where the occupied pixels and non-occupied pixels are distinguished and depicted respectively. The occupancy map may alternatively comprise a non-binary image allowing additional information to be stored in it. Therefore, the representative values of the DOM (Deep Occupancy Map) may comprise binary values or other values, for example integer values. It should be noticed that one cell of the 2D grid may produce a pixel during the image generation process. Such an occupancy map may be derived from the packing process 103.

The padding process 107 aims at filling the empty space between patches in order to generate a piecewise smooth image suited for video compression. For example, in a simple padding strategy, each block of T×T (e.g. 16×16) pixels is compressed independently. If the block is empty (i.e. unoccupied, i.e. all its pixels belong to empty space), then the pixels of the block are filled by copying either the last row or column of the previous T×T block in raster order. If the block is full (i.e. occupied, i.e., no empty pixels), nothing is done. If the block has both empty and filled pixels (i.e. edge block), then the empty pixels are iteratively filled with the average value of their non-empty neighbors.

The padded geometry images and padded texture images may be provided for video compression 108. The generated images/layers may be stored as video frames and compressed using for example the HM16.16 video codec according to the HM configurations provided as parameters. The video compression 108 also generates reconstructed geometry images to be provided for smoothing 109, wherein a smoothed geometry is determined based on the reconstructed geometry images and patch info from the patch generation 102. The smoothed geometry may be provided to texture image generation 105 to adapt the texture images.

The patch may be associated with auxiliary information being encoded/decoded for each patch as metadata. The auxiliary information may comprise index of the projection plane, 2D bounding box, 3D location of the patch.

For example, the following metadata may be encoded/decoded for every patch:

- index of the projection plane
  - Index 0 for the planes (1.0, 0.0, 0.0) and (−1.0, 0.0, 0.0)
  - Index 1 for the planes (0.0, 1.0, 0.0) and (0.0, −1.0, 0.0)
  - Index 2 for the planes (0.0, 0.0, 1.0) and (0.0, 0.0, −1.0)
- 2D bounding box (u0, v0, u1, v1)
- 3D location (x0, y0, z0) of the patch represented in terms of depth δ0, tangential shift s0 and bitangential shift r0. According to the chosen projection planes, (δ0, s0, r0) may be calculated as follows:
  - Index 0, δ0=x0, s0=z0 and r0=y0
  - Index 1, δ0=y0, s0=z0 and r0=x0
  - Index 2, δ0=z0, s0=x0 and r0=y0

Also, mapping information providing for each T×T block its associated patch index may be encoded as follows:

- For each T×T block, let L be the ordered list of the indexes of the patches such that their 2D bounding box contains that block. The order in the list is the same as the order used to encode the 2D bounding boxes. L is called the list of candidate patches.
- The empty space between patches is considered as a patch and is assigned the special index 0, which is added to the candidate patches list of all the blocks.
- Let I be index of the patch, which the current T×T block belongs to, and let J be the position of I in L. Instead of explicitly coding the index I, its position J is arithmetically encoded instead, which leads to better compression efficiency.

The occupancy map consists of a binary map that indicates for each cell of the grid whether it belongs to the empty space or to the point cloud. One cell of the 2D grid produces a pixel during the image generation process.

The occupancy map compression 110 leverages the auxiliary information described in previous section, in order to detect the empty T×T blocks (i.e. blocks with patch index 0). The remaining blocks may be encoded as follows: The occupancy map can be encoded with a precision of a B0×B0 blocks. B0 is a configurable parameter. In order to achieve lossless encoding, B0 may be set to 1. In practice B0=2 or B0=4 results in visually acceptable results, while significantly reducing the number of bits required to encode the occupancy map.

The compression process may comprise one or more of the following example operations:

- Binary values may be associated with B0×B0 sub-blocks belonging to the same T×T block. A value 1 associated with a sub-block, if it contains at least a non-padded pixel, and 0 otherwise. If a sub-block has a value of 1 it is said to be full, otherwise it is an empty sub-block.
- If all the sub-blocks of a T×T block are full (i.e., have value 1). The block is said to be full. Otherwise, the block is said to be non-full.
- A binary information may be encoded for each T×T block to indicate whether it is full or not.
- If the block is non-full, an extra information indicating the location of the full/empty sub-blocks may be encoded as follows:
  - Different traversal orders may be defined for the sub-blocks, for example horizontally, vertically, or diagonally starting from top right or top left corner
  - The encoder chooses one of the traversal orders and may explicitly signal its index in the bitstream.
  - The binary values associated with the sub-blocks may be encoded by using a run-length encoding strategy.
    - The binary value of the initial sub-block is encoded.
    - Continuous runs of 0s and 1s are detected, while following the traversal order selected by the encoder.
    - The number of detected runs is encoded.
    - The length of each run, except of the last one, is also encoded.

Figure 2:
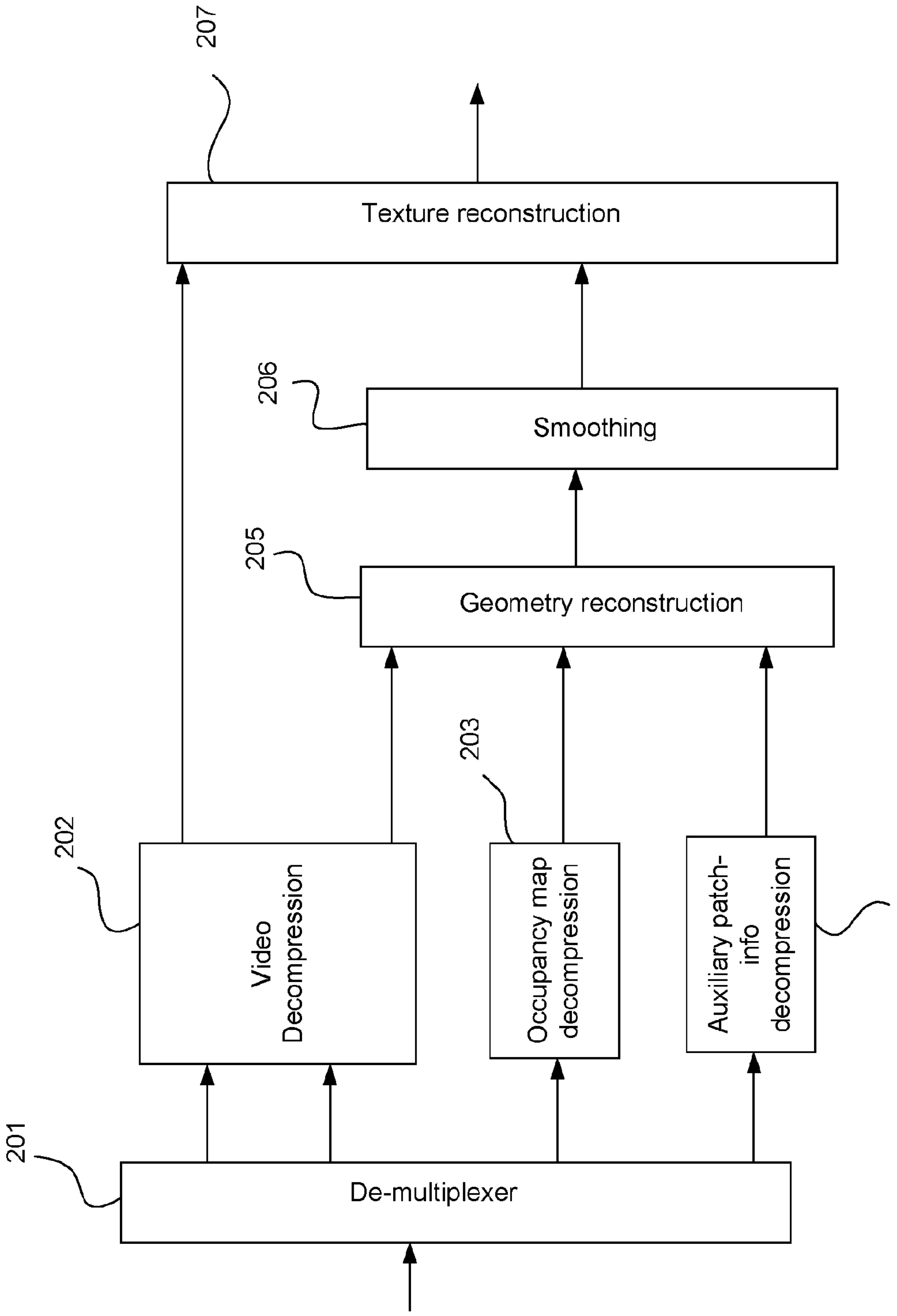
FIG. 2 shows an example of a volumetric video decompression process.

FIG. 2 illustrates an overview of a de-compression process for MPEG Point Cloud Coding (PCC). A de-multiplexer 201 receives a compressed bitstream, and after de-multiplexing, provides compressed texture video and compressed geometry video to video decompression 202. In addition, the de-multiplexer 201 transmits compressed occupancy map to occupancy map decompression 203. It may also transmit a compressed auxiliary patch information to auxiliary patch-info compression 204. Decompressed geometry video from the video decompression 202 is delivered to geometry reconstruction 205, as are the decompressed occupancy map and decompressed auxiliary patch information. The point cloud geometry reconstruction 205 process exploits the occupancy map information in order to detect the non-empty pixels in the geometry/texture images/layers. The 3D positions of the points associated with those pixels may be computed by leveraging the auxiliary patch information and the geometry images.

The reconstructed geometry image may be provided for smoothing 206, which aims at alleviating potential discontinuities that may arise at the patch boundaries due to compression artifacts. The implemented approach moves boundary points to the centroid of their nearest neighbors. The smoothed geometry may be transmitted to texture reconstruction 207, which also receives a decompressed texture video from video decompression 202. The texture reconstruction 207 outputs a reconstructed point cloud. The texture values for the texture reconstruction are directly read from the texture images.

The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let (δ0, s0, r0) be the 3D location of the patch to which it belongs and (u0, v0, u1, v1) its 2D bounding box. P can be expressed in terms of depth δ(u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image.

For the texture reconstruction, the texture values can be directly read from the texture images. The result of the decoding process is a 3D point cloud reconstruction.

Figure 3:
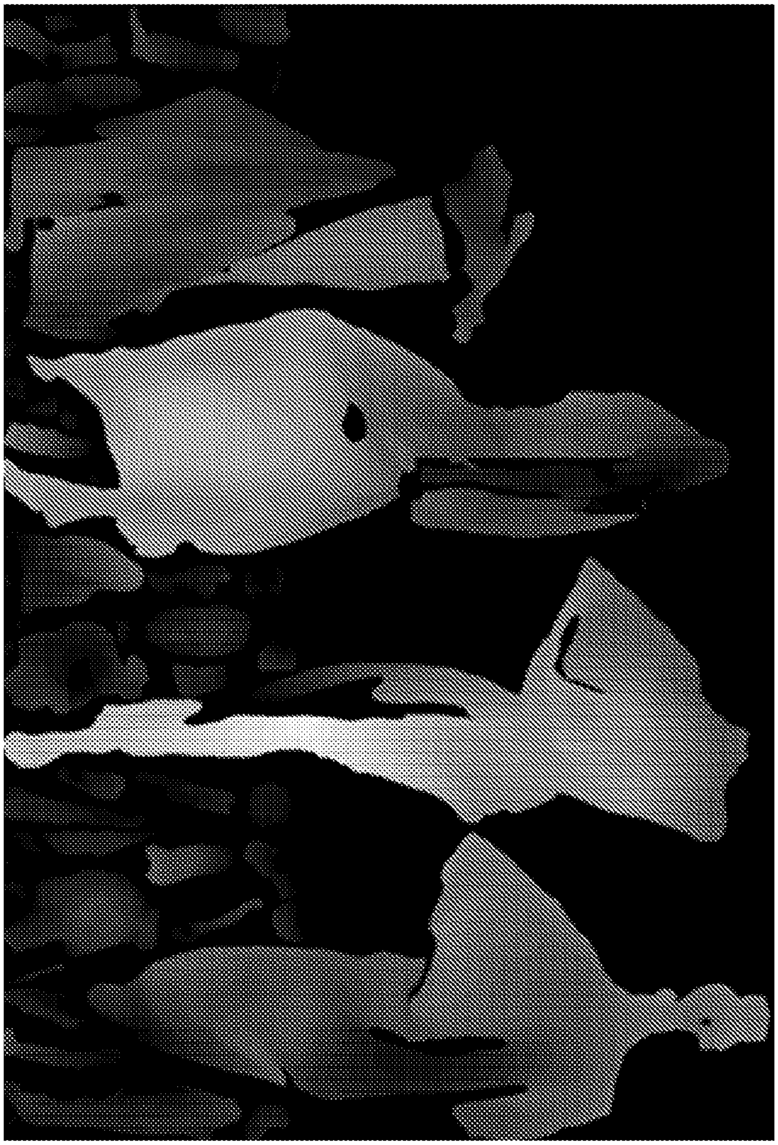
FIG. 3 shows an example of a depth image to be coded.
Figure 4B:
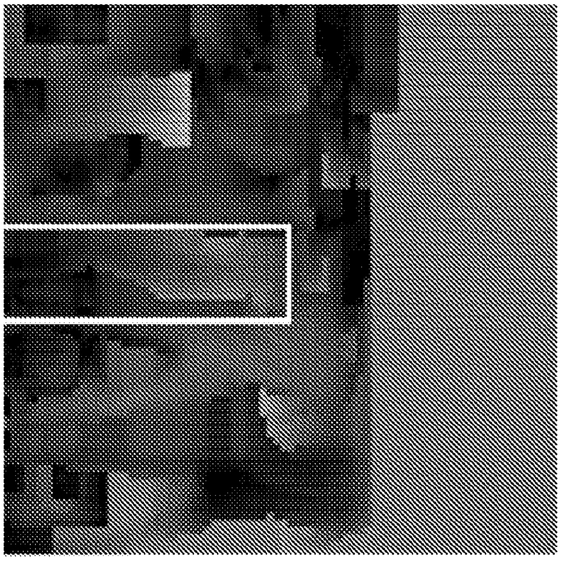
FIGS. 4*a*, 4*b* show examples of depth image for frame 0 and frame 2 after padding.
Figure 4A:
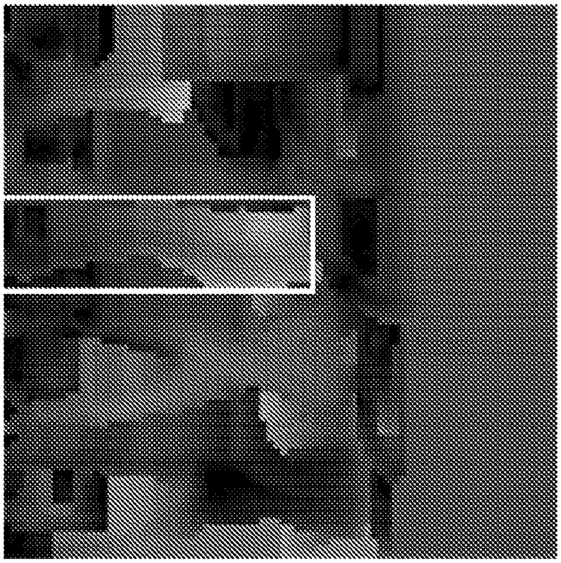

Geometry patches may be packed without any consideration of their values, e.g. as shown in FIGS. 3 and 4.

As is seen in FIGS. 3 and 4, there are significant initial value differences between the patches, leading to sharp padding boundaries and value changes in the padded areas shown in FIG. 4. Furthermore, there are even differences between the same patch but for different temporal instances, as highlighted with the rectangles 410 in FIG. 4.

Such value differences will affect intra and inter prediction negatively and increase the required bit rate. Simple signaling of initial patch value offsets, as is described in relation to the present embodiments, can reduce this effect and provide significantly improved coding efficiency without any increase in computational complexity.

Figure 5:
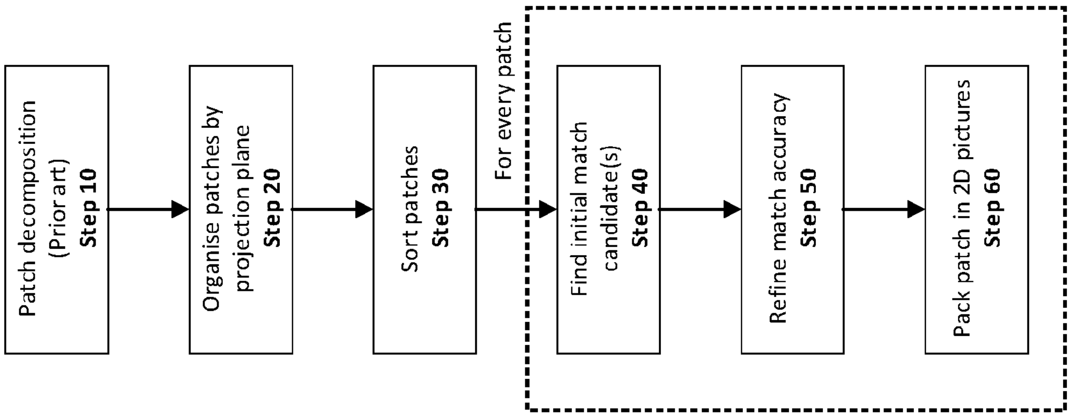
FIG. 5 shows an example of a processing chain for temporal aligned 2D packing of texture and geometry patches.

FIG. 5 illustrates an example of a temporal aligned 2D packing of texture and geometry patches in their respective image frames. The present embodiments deviate from the solution of FIG. 5 in such a manner that they are targeted to temporal and spatial alignment of packed geometry patches for improved coding efficiency due to better intra and inter frame prediction. The present embodiments thus significantly improve temporal alignment and consistency between the current frame and its reference frame. Thus, motion-compensated video compression performs at its best and coding efficiency may be improved.

In contrast to the example of FIG. 5, the present embodiments align the 3D data geometry values (data) represented as geometry (depth) patches to each other, instead of the location of the patches themselves. This functionality can be interpreted as z-alignment, while FIG. 5 performs x/y alignment (2D pixel coordinates).

The present embodiments can be utilized together with example of FIG. 5 (or any other similar example) or as a standalone solution.

The present embodiments relate to algorithms to increase spatial consistency between geometry patches packed in a PCC (Point Cloud Compressed) depth image (projected volumetric video geometry patches), and temporal consistency, between two or more consecutive (in a coding order sense) frames of such kind. The present embodiments cover temporal smoothing and intra frame alignment by taking into account the neighboring patches.

The present embodiments propose inserting into a bitstream a signal indicating one or more of the following:

- intra frame z-offset, i.e. signaling a Z value offset between two patches within a frame (packing order). This feature may improve padding between patches, thus provides an improved intra-prediction and reduced bit rate requirements.
- inter frame z-offset, i.e. signaling Z value offset between two similar patches in different frames (encoding order). This feature may reduce residual between reference and temporal prediction, and thus provides reduced bit rate requirements.
- signaling z-depth smoothness constraint, which may reduce temporal flicker in 3D reconstruction (improves reconstruction quality and works on intra and inter offset, as well in original implementation without any z-offsets). This feature improves 3D reconstruction quality with marginal impact on coding efficiency improvements.

The above features are discussed next in more detailed manner.

Intra Frame z-Offset

Figure 6:
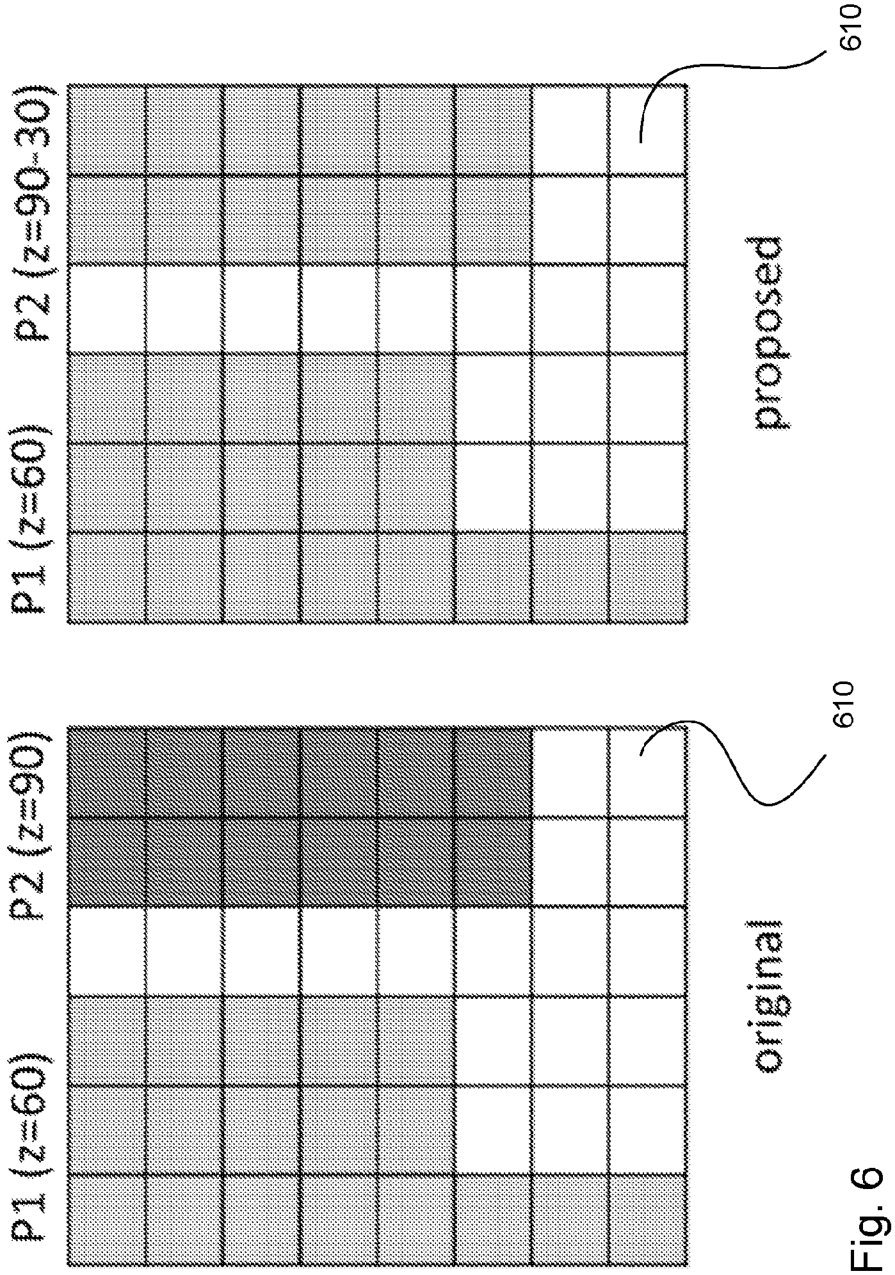
FIG. 6 shows an example of a simplified intra frame z-offset approach.

Intra frame z-offset solution addresses z-offsets between patches within the same image. The image may be a geometry image. Such offsets reduce the difference between neighboring patches, thus improving intra prediction and reducing required bit rates. FIG. 6 illustrates an example of the proposed approach, where for simplification the patches P1 and P2 have a constant value over all pixel (z=60 for P1, z=90 for P2). The white squares 610 denote empty space between the patches, which would require padding to be filled. This offset reduces the padding gradient between the patches and thus reduces bit rate requirements.

The offset can be, for example, signaled in the auxiliary patch metadata:

| | Descriptor |
|---|---|
| group_of_frames_auxiliary_information( ) { | |
| patch_count | u(32) |
| occupancy_precision | u(8) |
| max_candidate_Count | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |
| ByteCount += 15 | |
| for( i = 0; i < patchCount; i++ ) { | |
| patchList[i].patch_u0 | ae(v) |
| patchList[i].patch_v0 | ae(v) |
| patchList[i].patch_u1 | ae(v) |
| patchList[i].patch_v1 | ae(v) |
| patchList[i].patch_d1 | ae(v) |
| patchList[i].patch_zOff_idx | u(8) |
| patchList[i].patch_zOff_val | ae(v) |
| patchList[i].delta_size_u0 | se(v) |
| patchList[i].delta_size_v0 | se(v) |
| patchList[i].normal_axis | ae(v) |
| } | |
| for( i = 0; i < blockCount; i++ ) { | |
| if( candidatePatches[i].size( ) == 1 ) | |
| blockToPatch[i] = candidatePatches[i][0] | |
| else{ | |
| candidate_index | ae(v) |
| if(candidate_index== max_candidate_count ) | |

-continued

| | Descriptor |
|---|---|
| blockToPatch[i] = patch_index | ae(v) |
| else | |
| blockToPatch[i] = candidatePatches[i][candidate_index] | |
| } | |
| } | |
| ByteCount+= occupancy_auxilary_stream_size | |
| } | |
| , | |

where patchList[i].patch_zOff_idx and patchList[i].patch_zOff_val are provided by the present solution.

According to an embodiment, a z-value offset between patches of the same frame is signaled with respect to another patch of the same frame. Such embodiment requires the signaling of the "reference patch" (i.e. patchList[i].patch_zOff_idx) and the actual offset (patchList[i].patch_zOff_val). The decoder receives this information and adjusts the geometry patch values of patch[i] as follows:

patch[*i*]=patch[*i*]+(patchList[patchList[*i*].patch_zOff_idx].patch_zOff_val+patchList[*i*].patch_zOff_val)

According to another embodiment, only the z-value offset is signaled without reference to other patches. The decoder receives this information and adjusts the geometry patch values of patch[i] as follows:

patch[*i*]=patch[*i*]+patchList[*i*].patch_zOff_val

According to an embodiment, the z-value offset between patches is derived by comparing neighboring patches in intra prediction direction, i.e. comparing the current patch to other patches located to the left and/or top, to identify a suitable candidate. Another patch may be considered suitable if it overlaps with the 2D pixel dimension and location of the current patch. I.e. in FIG. 7, patch P2 would be the preferred patch to calculate the offset for P3 (as P1 as less overlap). Patches to the right or bottom would not be in intra prediction direction anyway and thus do not need to be considered.

Figure 7:
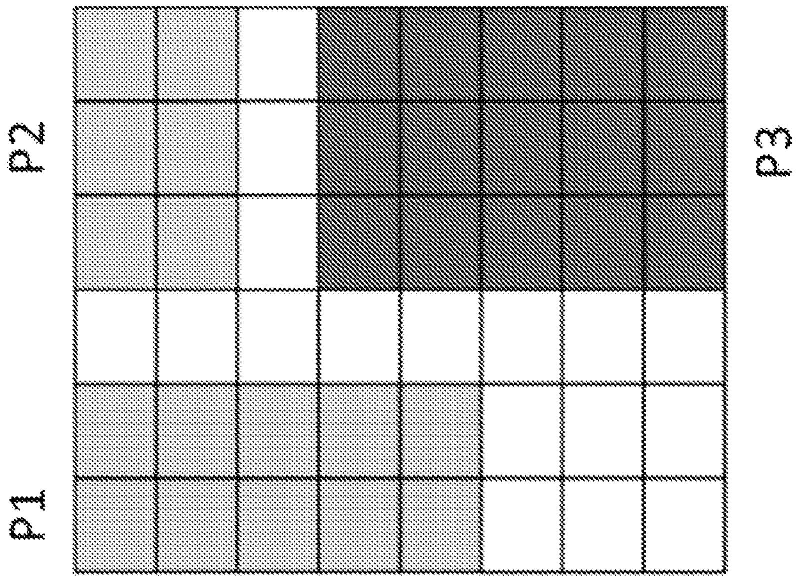
FIG. 7 shows an embodiment of an intra frame z-offset approach.

According to an embodiment, the z-value offset is calculated by the one or a combination of the following:

- difference in mean value between two patches
- difference in median value between two patches
- difference in closest pixel values, e.g. bottom line of P2 against top line of P3 in FIG. 7. Again, mean or median can be utilized
- calculating for each patch edge pixel the delta depth between the edge pixel and the closest neighboring patch edge. Minimizing the depth delta values for all patches by finding new depth offsets for each patch=stabilizes depth values for full frame.

According to an embodiment, where several patches have similar overlap with the current patch, the patch with the lowest difference signaling cost shall be selected for calculating the z-value offset, i.e. signaling a smaller z-offset may be slightly cheaper.

According to an embodiment, the optimal z-value offset values are calculated not in patch level, but in block basis for example 16×16 pixels and low-resolution lossless/lossy video (single channel attribute channel) is used to transmit the z offset data. Block-based z-value offsets can be calculated by taking min/average/mean values of all the block pixels. Resulting single depth values per block can be smoothed with the neighboring block values.

According to an embodiment, for each patch a 3D depth plane is estimated and used to offset the values. Depth plane can be expressed with a a*x+b*y+c*z=d, where plane coefficients a, b, c, d would be signaled per patch. Plane offers more freedom compared to a single depth value offset.

Figure 8:
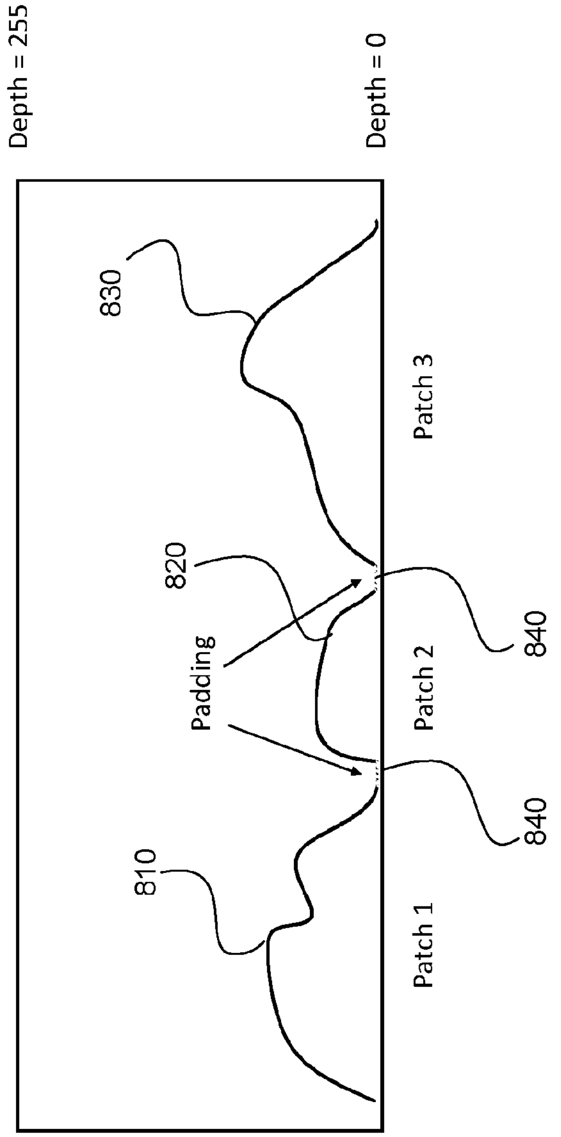
FIG. 8 shows an example of three patches packed into 2D atlas.

According to an embodiment, each patch depth value can be inverted with a Boolean flag that is encoded in the metadata. Consider three neighboring patches 810, 820, 830, as shown in FIG. 8. Between patch 810 and patch 820, and patch 820 and patch 830, there is sharp depth value change that will affect the video compression. Once patches are packed into 2D atlas, padding is applied as shown with dotted line 840. By introducing option to invert depth values (newDepth=255−oldDepth) and with constant per patch offsetting the result shown in FIG. 9 can be achieved.

Figure 9:
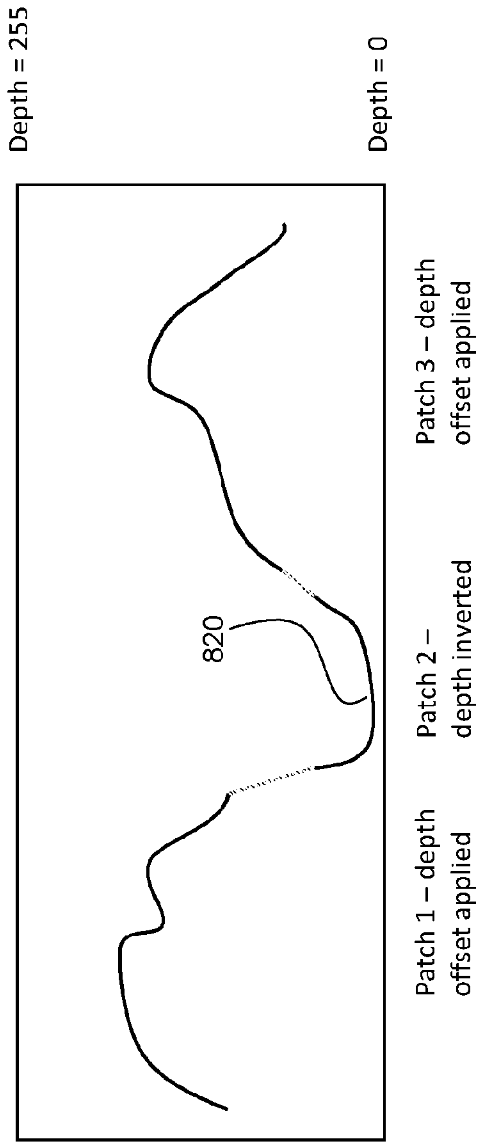
FIG. 9 shows an example of three patches of FIG. 8 having depth values of one of the patches inverted.

As shown in FIG. 9, patch's 820 depth values have been inverted and all the patch offset values have been adjusted so that there is more continuous signal that will be compressed better. Whether or not to invert a patch depends on the neighboring patches, and the detection can be achieved by checking depth gradient/derivate/delta values between the patch edges.

Inter Frame z-Offset

Figure 10:
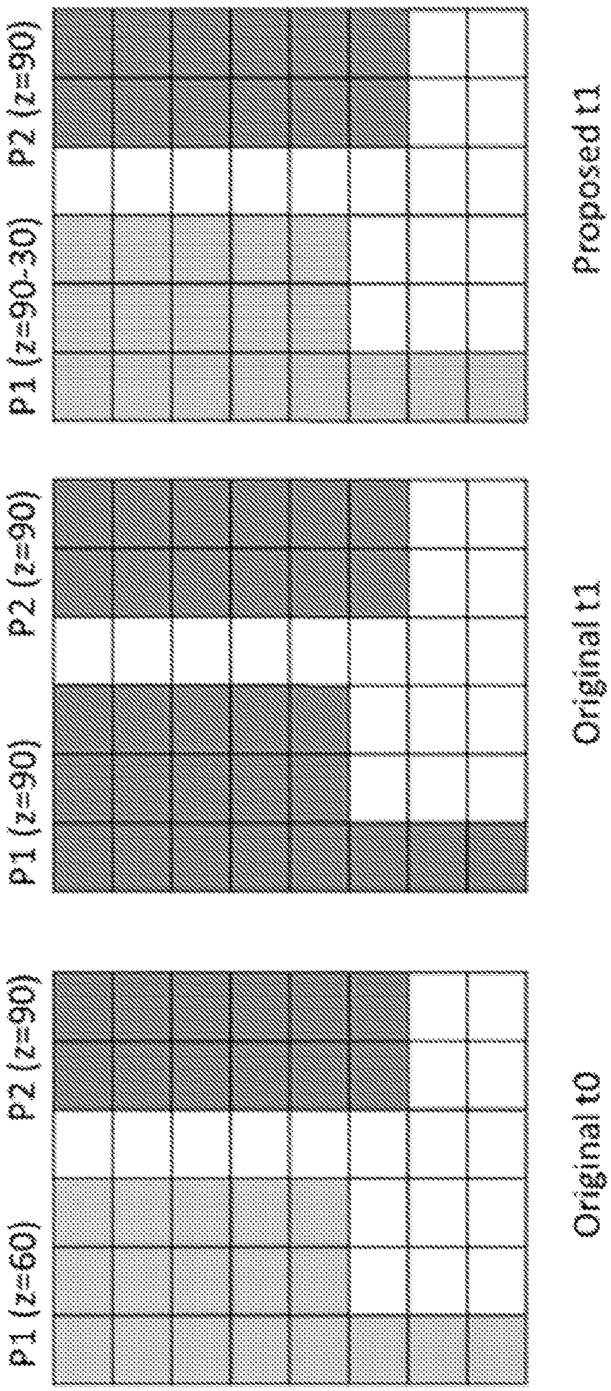
FIG. 10 shows a simplified example of inter frame z-offset approach.

The inter frame z-offset solution addresses z-offsets between similar patches in temporally consecutive geometry images (inter). Similarity of patches in different frames means that the position (x,y,z or u,v,d) of the patch is similar between the frames. The term "temporally consecutive" refers here to the coding order and not necessarily the display order. The idea is to minimize the difference between reference and temporal prediction, thus improving inter prediction and reducing required bit rates. FIG. 10 illustrates an example for the proposed approach, where for simplification the patches have a constant value over all pixels. Signaling an offset of 30 in the patch metadata for the geometry frame at t1, will reduce the temporal prediction residual, thus reducing required bit rate.

Such an offset can be, for example, signaled in the auxiliary patch metadata. The resulting signaling is presented below:

| | Descriptor |
|---|---|
| group_of_frames_auxiliary_information( ) { | |
| patch_count | u(32) |
| occupancy_precision | u(8) |
| max_candidate_Count | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |
| ByteCount += 15 | |
| for( i = 0; i < patchCount; i++ ) { | |
| patchList[i].patch_u0 | ae(v) |
| patchList[i].patch_v0 | ae(v) |
| patchList[i].patch_u1 | ae(v) |
| patchList[i].patch_v1 | ae(v) |
| patchList[i].patch_d1 | ae(v) |
| patchList[i].patch_temp_zOff_val | ae(v) |

-continued

| | Descriptor |
|---|---|
| patchList[i].delta__size__u0 | se(v) |
| patchList[i].delta__size__v0 | se(v) |
| patchList[i].normal__axis | ae(v) |
| } | |
| for( i = 0; i < blockCount; i++ ) { | |
| if( candidatePatches[i].size( ) == 1 ) | |
| blockToPatch[i] = candidatePatches[i][0] | |
| else { | |
| candidate__index | ae(v) |
| if( candidate__index == max__candidate__count ) | |
| blockToPatch[i] = patch__index | ae(v) |
| else | |
| blockToPatch[i] = candidatePatches[i][candidate__index] | |
| } | |
| } | |
| ByteCount += occupancy__auxilary__stream__size | |
| } | |
| , | |

where patchList[i].patch_temp_zOff_val is provided by the present embodiment.

Patch index signalling may not be needed for this embodiment.

The following section provides more detailed information on various embodiments:

According to an embodiment, a temporal z-value offset for a patch is signalled. The decoder receives the information and adjusts the geometry patch values of patch[i] as follows:

$$patch[i]=patch[i]+patchList[i].patch\_temp\_zOff\_val$$

According to an embodiment, the z-value offset is derived by comparing the current patch to the respective location in any reference geometry image used for temporal prediction. It is not necessary to perform temporal alignment, e.g. as presented in FIG. 5, but may be beneficial. However, it may be enough to consider the pixel values of the padded reference image at the location of the current patch under consideration.

According to an embodiment, the z-value offset is calculated by the one or a combination of the following:

- difference in mean value between the current patch and the pixel values of its respective location in the reference image
- difference in media value between the current patch and the pixel values of its respective location in the reference image According to an embodiment, temporal patch similarity is identified by means of

- 3D data analysis, e.g. reproject patches into 3D space and calculate 3D distance, or
- metadata analysis, e.g. temporal consecutive patches with similar dimensions, 3D locations and projection plane.

Such similarity measure can be then be used to identify "patch pairs" to calculate the temporal z-offset from.

Figure 11:
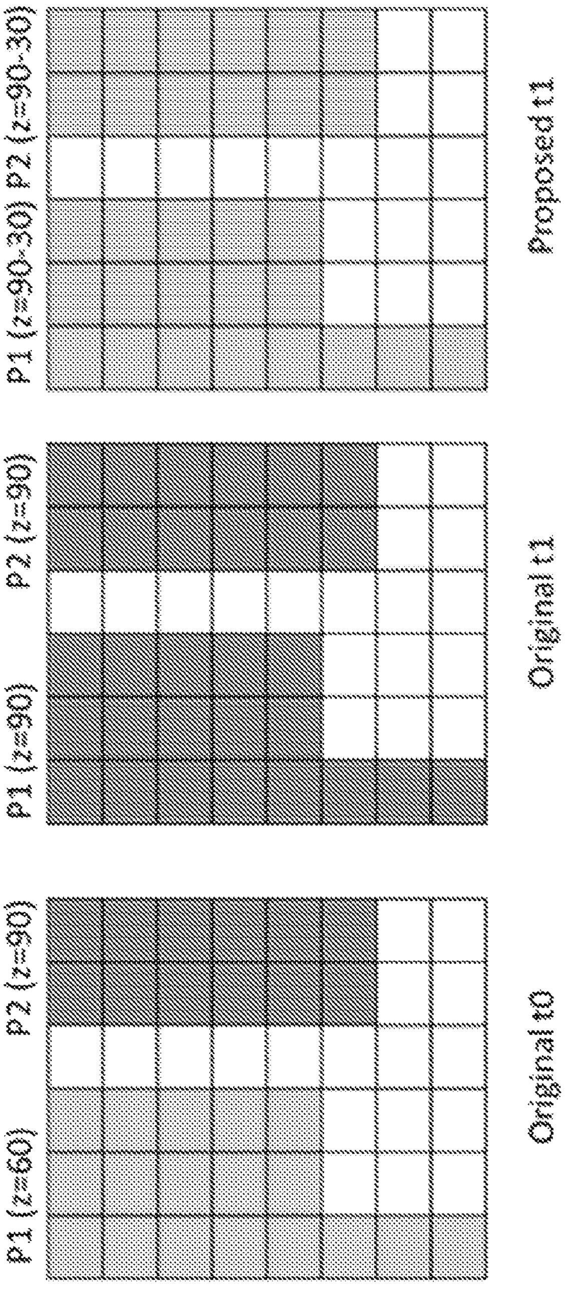
FIG. 11 shows a simplified example of combination of inter and intra frame z-offset.

According to an embodiment, intra and inter frame z-offsets are combined, thus leading to the signaling presented below. FIG. 11 illustrates the simplified outcome of the signaling.

| group_of_frames_auxiliary_information( ) { | Descriptor |
|---|---|
| patch_count | u(32) |
| occupancy_precision | u(8) |
| max_candidate_Count | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |
| ByteCount += 15 | |
| for( i = 0; i < patchCount; i++ ) { | |
| patchList[i].patch_u0 | ae(v) |
| patchList[i].patch_v0 | ae(v) |
| patchList[i].patch_u1 | ae(v) |
| patchList[i].patch_v1 | ae(v) |
| patchList[i].patch_d1 | ae(v) |
| patchList[i].patch_zOff_idx | u(8) |
| patchList[i].patch_zOff_val | ae(v) |
| patchList[i].patch_temp_zOff_val | ae(v) |
| patchList[i].delta_size_u0 | se(v) |
| patchList[i].delta_size_v0 | se(v) |
| patchList[i].normal_axis | ae(v) |
| } | |
| for( i = 0; i < blockCount; i++ ) { | |
| if( candidatePatches[i].size( ) == 1 ) | |
| blockToPatch[i] = candidatePatches[i][0] | |
| else { | |
| candidate_index | ae(v) |
| if( candidate index == max_candidate_count ) | |
| blockToPatch[i] = patch_index | ae(v) |
| else | |
| blockToPatch[i] = candidatePatches[i][candidate_index] | |
| } | |
| } | |
| ByteCount += occupancy_auxilary_stream_size | |
| }, | |

where patchList[i].patch_zOff_idx, patchList[i].patch_zOff_val, and patchList[i].patch_temp_zOff_val are provided by the present embodiments.

According to an embodiment, either intra or inter z-offset (or both) are predicted from the available patch metadata. I.e. two patches have the same projection plane, but differences in 3D location. The z-value of this difference is taken as z-offset prediction and only the residual between prediction and actual calculated offset is signaled.

According to an embodiment, no individual z-offset is signaled, instead the z-value offset is incorporated in the 3D location of the patch metadata (patchList[i].patch_d1 in the tables above).

Z-Depth Smoothness Constraint

Figure 12:
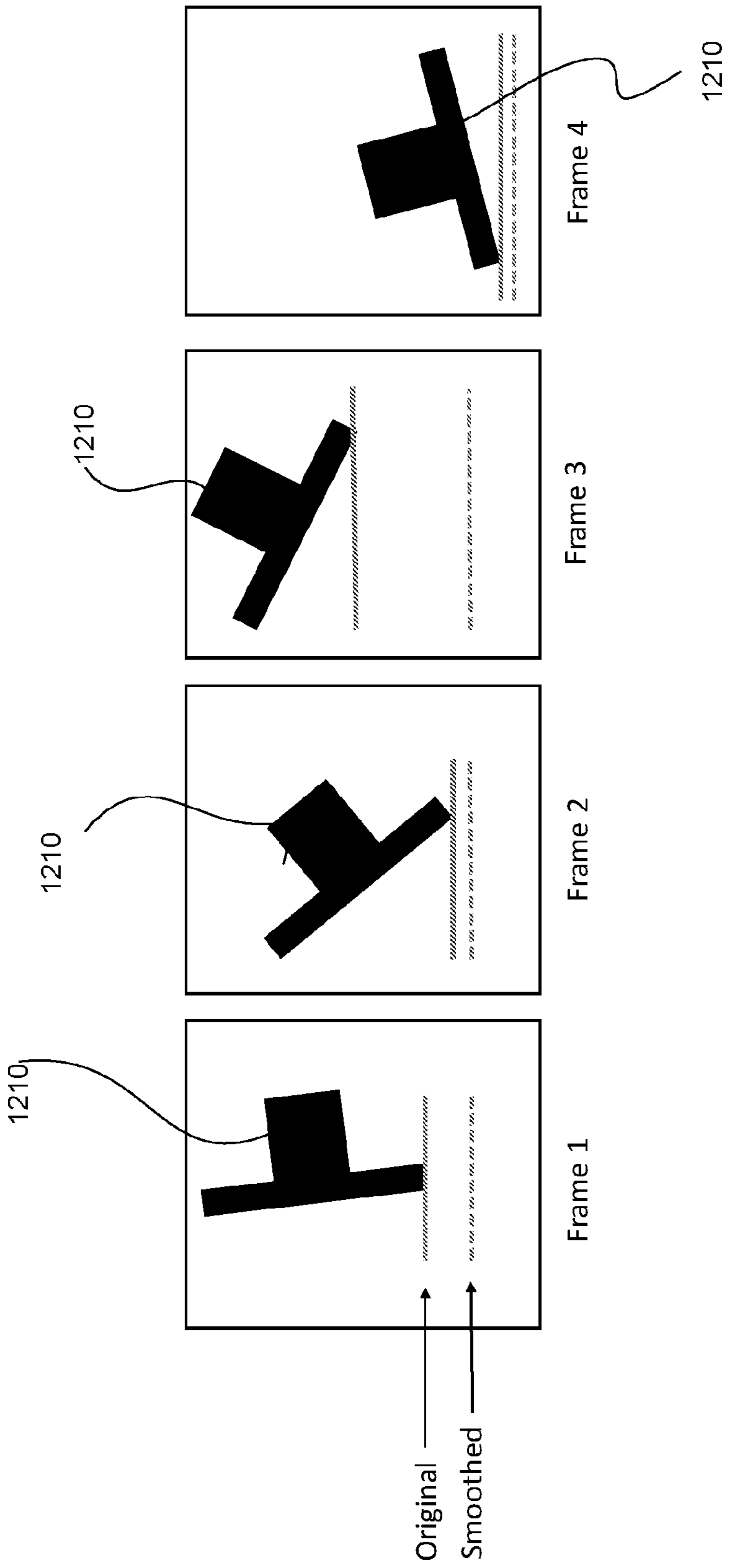
FIG. 12 shows an example of z-depth smoothness constraint.

Depth minimum for each patch can be calculated from the depth values. All the depth values will be then decreased by this minimum and therefore depth values in the video start from the depth value of zero. FIG. 12 shows this example visually, where "original" depth values touch the object 1210. However, this may not be an optimal solution as sharp changes in the object shape, rotation and object moving in z-dimension will rapidly change the depth values and therefore the video compression is affected. For example, the video may have grayscale flickering).

Depth minimum smoothing can be applied so that minimum depth values are collected for a group of frames, and then those values are smoothed over the sequence. After the depth minimum smoothing actual depth values need to be changed (add=smoothed-original) and depth offset values are stored for each patch for the decoder to construct the original values.

Depth smoothing will eliminate some of the rapid depth changes and therefore better video compression can be achieved.

Figure 13:
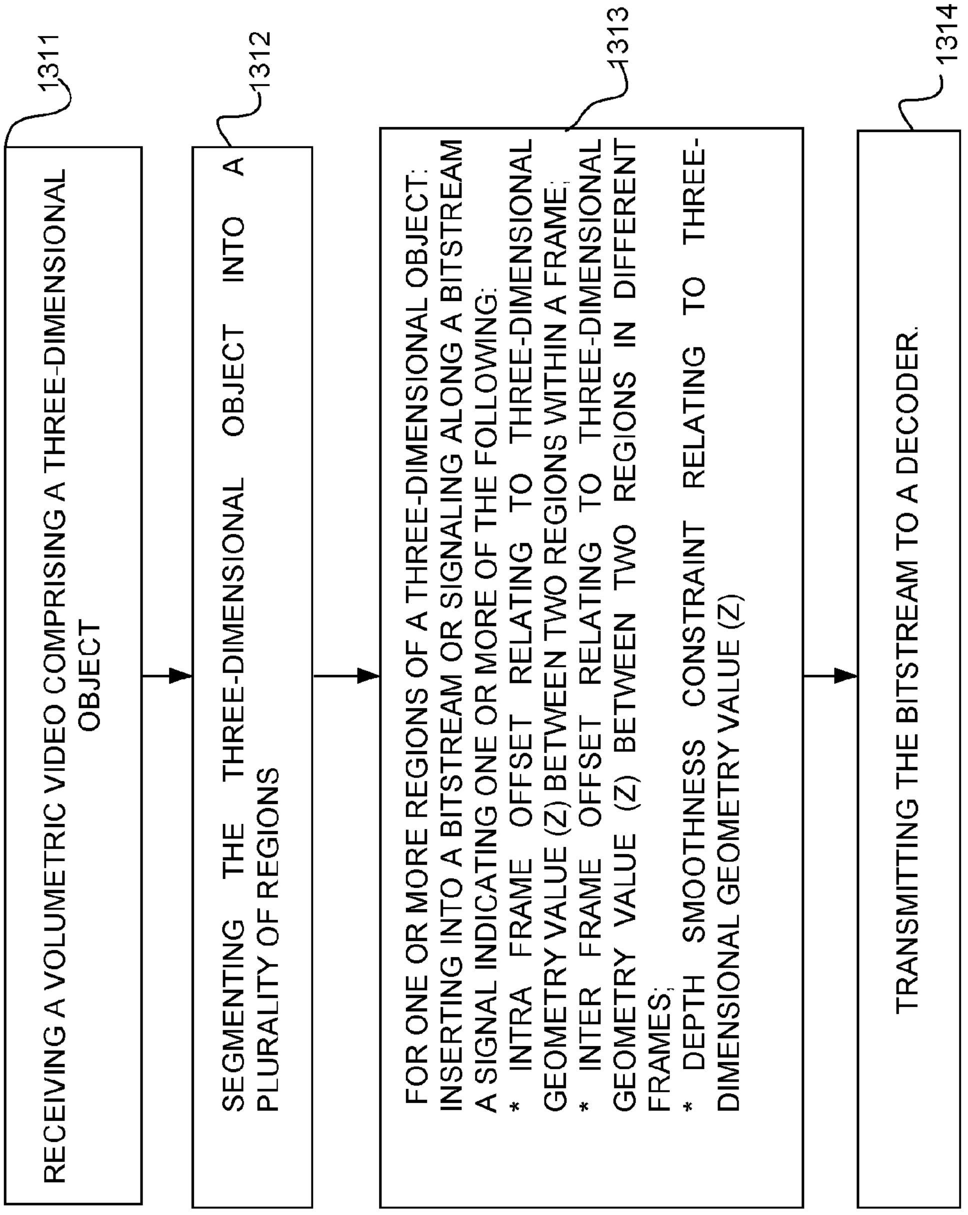
FIG. 13 is a flowchart illustrating a method according to an embodiment.

FIG. 13 is a flowchart illustrating a method according to an embodiment. A method comprises receiving 1311 a volumetric video comprising a three-dimensional object; segmenting 1312 the three-dimensional object into a plurality of regions; for one or more regions of a three-dimensional object: inserting 1313 into a bitstream or signaling along a bitstream a signal indicating one or more of the following: intra frame offset relating to three-dimensional geometry value (Z) between two regions within a frame; inter frame offset relating to three-dimensional geometry value (Z) between two regions in different frames; depth smoothness constraint relating to three-dimensional geometry value (Z); and transmitting 1314 the bitstream to a decoder.

Figure 14:
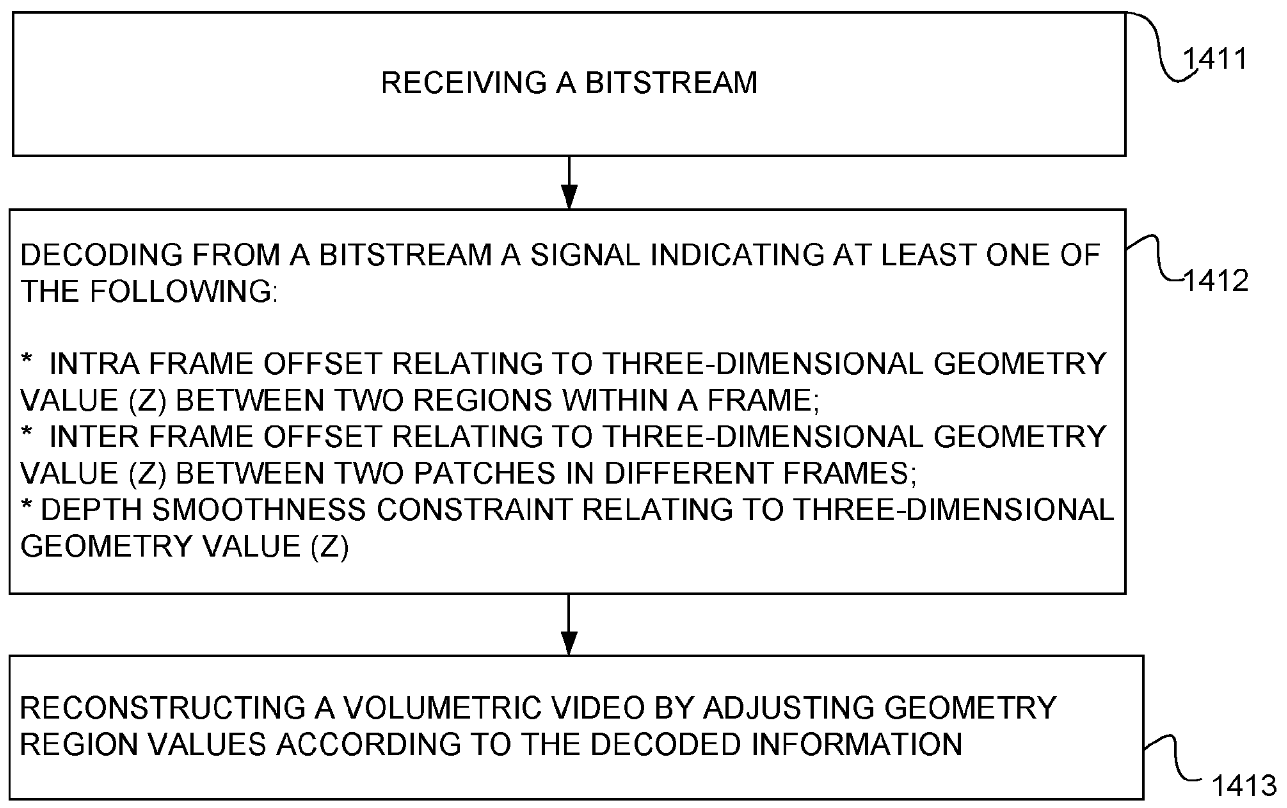
FIG. 14 is a flowchart illustrating a method according to another embodiment.

The decoder receives the bitstream from the encoder and performs the inverse operation of reconstruction as described in FIG. 13. FIG. 14 is a flowchart illustrating a method according to another embodiment. A method comprises receiving 1411 a bitstream; decoding 1412 from a bitstream a signal indicating at least one of the following: intra frame offset relating to three-dimensional geometry value (Z) between two regions within a frame; inter frame offset relating to three-dimensional geometry value (Z) between two patches in different frames; depth smoothness constraint relating to three-dimensional geometry value (Z); and reconstructing 1413 a volumetric video by adjusting geometry region values according to the decoded information.

An apparatus according to an embodiment comprises means for receiving a volumetric video comprising a three-dimensional object; means for segmenting the three-dimensional object into a plurality of regions; for one or more regions of a three-dimensional object: means for inserting into a bitstream or signaling along a bitstream a signal indicating one or more of the following: intra frame offset relating to three-dimensional geometry value (Z) between two regions within a frame; inter frame offset relating to three-dimensional geometry value (Z) between two regions in different frames; depth smoothness constraint relating to three-dimensional geometry value (Z); and means for transmitting the bitstream to a decoder. The means comprises at least one processor, and a memory including a computer program code, wherein the processor may further comprise processor circuitry. The memory and the computer program code are configured to, with the at least one processor, cause the apparatus to perform the method according to various embodiments.

An apparatus according to another embodiment comprises means for receiving a bitstream; means for decoding from a bitstream a signal indicating at least one of the following: intra frame offset relating to three-dimensional geometry value (Z) between two regions within a frame; inter frame offset relating to three-dimensional geometry value (Z) between two patches in different frames; depth smoothness constraint relating to three-dimensional geometry value (Z); and means for reconstructing a volumetric video by adjusting geometry region values according to the decoded information. The means comprises at least one processor, and a memory including a computer program code, wherein the processor may further comprise processor circuitry. The memory and the computer program code are configured to, with the at least one processor, cause the apparatus to perform the method according to various embodiments.

Figure 15:
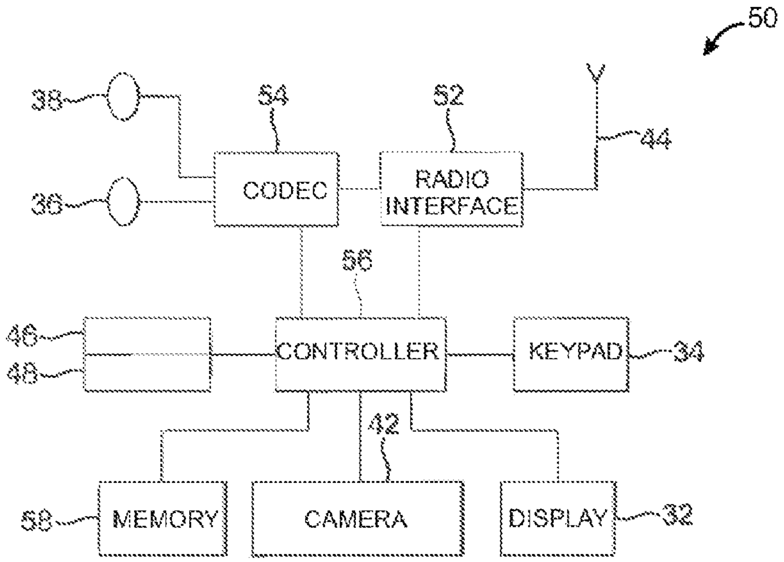
FIG. 15 shows an apparatus according to an embodiment in a simplified manner.

An example of an apparatus is disclosed with reference to FIG. 15. FIG. 15 shows a block diagram of a video coding system according to an example embodiment as a schematic block diagram of an electronic device 50, which may incorporate a codec. In some embodiments the electronic device may comprise an encoder or a decoder. The electronic device 50 may for example be a mobile terminal or a user equipment of a wireless communication system or a camera device. The electronic device 50 may be also comprised at a local or a remote server or a graphics processing unit of a computer. The device may be also comprised as part of a head-mounted display device. The apparatus 50 may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The camera 42 may be a multi-lens camera system having at least two camera sensors. The camera is capable of recording or detecting individual frames which are then passed to the codec 54 or the controller for processing. The apparatus may receive the video and/or image data for processing from another device prior to transmission and/or storage.

The apparatus 50 may comprise a controller 56 or processor for controlling the apparatus 50. The apparatus or the controller 56 may comprise one or more processors or processor circuitry and be connected to memory 58 which may store data in the form of image, video and/or audio data, and/or may also store instructions for implementation on the controller 56 or to be executed by the processors or the processor circuitry. The controller 56 may further be connected to codec circuitry 54 suitable for carrying out coding and decoding of image, video and/or audio data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network. The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es). The apparatus may comprise one or more wired interfaces configured to transmit and/or receive data over a wired connection, for example an electrical cable or an optical fiber connection.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. According to an embodiment, said operational characteristics are being defined through configuration by said computer based on the type of said processor, wherein a system is connectable to said processor by a bus, wherein a programmable operational characteristic of the system comprises receiving a volumetric video comprising a three-dimensional object; segmenting the three-dimensional object into a plurality of regions; for one or more regions of a three-dimensional object: inserting into a bitstream or signaling along a bitstream a signal indicating one or more of the following: intra frame offset relating to three-dimensional geometry value (Z) between two regions within a frame; inter frame offset relating to three-dimensional geometry value (Z) between two regions in different frames; depth smoothness constraint relating to three-dimensional geometry value (Z); and transmitting the bitstream to a decoder.

According to another embodiment, said operational characteristics are being defined through configuration by said computer based on the type of said processor, wherein a system is connectable to said processor by a bus, wherein a programmable operational characteristic of the system comprises receiving a bitstream; decoding from a bitstream a signal indicating at least one of the following: intra frame offset relating to three-dimensional geometry value (Z) between two regions within a frame; inter frame offset relating to three-dimensional geometry value (Z) between two patches in different frames; depth smoothness constraint relating to three-dimensional geometry value (Z); and reconstructing a volumetric video by adjusting geometry region values according to the decoded information.

The computer program code can be a part of a computer program product that may be embodied on a non-transitory computer readable medium. Alternatively, the computer program product may be downloadable via communication network.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:

receiving a volumetric video comprising a three-dimensional object;

segmenting the three-dimensional object into a plurality of regions;

for one or more regions of the three-dimensional object:

inserting into a bitstream or signaling along a bitstream a signal indicating one or more of the following:

an intra frame offset relating to a first z coordinate three-dimensional geometry value between two regions within a frame, the intra frame offset configured to be used to adjust the first z coordinate three-dimensional geometry value of a geometry region within the frame with applying the intra frame offset to the first z coordinate three-dimensional geometry value of the geometry region within the frame;

an inter frame offset relating to a second z coordinate three-dimensional geometry value between two patches in different frames, the inter frame offset configured to be used to adjust the second z coordinate three-dimensional geometry value of a geometry patch in a different frame with applying the inter frame offset to the second z coordinate three-dimensional geometry value of the geometry patch in the different frame;

a depth smoothness constraint relating to a third z coordinate three-dimensional geometry value, wherein the third z coordinate three-dimensional geometry value is subtracted from depth values of the one or more regions so that the depth values no longer have a common value with the three-dimensional object; and transmitting the bitstream to a decoder.

2. The method according to claim 1, further comprising inserting into the bitstream an intra frame offset relating to a three-dimensional geometry value (Z) with respect to another region of the frame.

3. The method according to claim 1, further comprising determining the intra frame offset between the two regions by comparing a region to other patches located on the left and/or top of the region.

4. The method according to claim 1, further comprising selecting a region with lowest difference signaling cost for calculation of the intra frame offset.

5. The method according to claim 1, wherein the one or more regions comprise a patch or a block.

6. The method according to claim 1, wherein the inter frame offset relating to the three-dimensional geometry value is determined between patches in temporally consecutive geometry images.

7. The method according to claim 1, further comprising determining the inter frame offset by comparing a patch to a respective location in a reference geometry image used for temporal prediction.

8. The method according to claim 1, further comprising selecting patches for the inter frame offset according to similarity of the patches with respect to a three-dimensional distance, a three-dimensional location, or dimensions of temporal consecutive patches.

9. An apparatus comprising at least one processor and at least one non-transitory memory, said at least one memory including computer program code, the at least one memory and the computer program code configured to, with the at least one processor, cause the apparatus at least to:

receive a volumetric video comprising a three-dimensional object;

segment the three-dimensional object into a plurality of regions;

for one or more regions of the three-dimensional object:

insert into a bitstream or signal along a bitstream a signal indicating one or more of the following:

an intra frame offset relating to a first z coordinate three-dimensional geometry value between two regions within a frame, the intra frame offset configured to be used to adjust the first z coordinate three-dimensional geometry value of a geometry region within the frame with applying the intra frame offset to the first z coordinate three-dimensional geometry value of the geometry region within the frame;

an inter frame offset relating to a second z coordinate three-dimensional geometry value between two patches in different frames, the inter frame offset configured to be used to adjust the second z coordinate three-dimensional geometry value of a geometry patch in a different frame with applying the inter frame offset to the second z coordinate three-dimensional geometry value of the geometry patch in the different frame;

a depth smoothness constraint relating to a third z coordinate three-dimensional geometry value, wherein the third z coordinate three-dimensional geometry value is subtracted from depth values of the one or more regions so that the depth values no longer have a common value with the three-dimensional object; and transmit the bitstream to a decoder.

10. The apparatus according to claim 9, wherein the at least one memory and the computer program code are further configured to, with the at least one processor, further cause the apparatus to: insert into the bitstream an intra frame offset relating to a three-dimensional geometry value (Z) with respect to another region of the frame.

11. The apparatus according to claim 9, wherein the at least one memory and the computer program code are further configured to, with the at least one processor, further cause the apparatus to: determine the intra frame offset between the two patches by comparing a region to other patches located on the left and/or top of the region.

12. The apparatus according to claim 9, wherein the at least one memory and the computer program code are further configured to, with the at least one processor, further cause the apparatus to: select a region with lowest difference signaling cost for calculation of the intra frame offset.

13. The apparatus according to claim 9, wherein the one or more regions comprise a patch or a block.

14. The apparatus according to claim 9, wherein the inter frame offset relating to the three-dimensional geometry value is determined between patches in temporally consecutive geometry images.

15. The apparatus according to claim 9, wherein the at least one memory and the computer program code are further configured to, with the at least one processor, further cause the apparatus to: determine the inter frame offset by comparing a patch to a respective location in a reference geometry image used for temporal prediction.

16. The apparatus according to claim 9, wherein the at least one memory and the computer program code are further configured to, with the at least one processor, further cause the apparatus to: select patches for the inter frame offset according to similarity of the patches with respect to a three-dimensional distance, a three-dimensional location, or dimensions of temporal consecutive patches.

17. A method comprising:

receiving a bitstream;

decoding from a bitstream a signal indicating at least one of the following:

an intra frame offset relating to a first z coordinate three-dimensional geometry value between two regions within a frame, the intra frame offset configured to be used to adjust the first z coordinate three-dimensional geometry value of a geometry region within the frame with applying the intra frame offset to the first z coordinate three-dimensional geometry value of the geometry region within the frame;

an inter frame offset relating to a second z coordinate three-dimensional geometry value between two patches in different frames, the inter frame offset configured to be used to adjust the second z coordinate three-dimensional geometry value of a geometry patch in a different frame with applying the inter frame offset to the second z coordinate three-dimensional geometry value of the geometry patch in the different frame;

a depth smoothness constraint relating to a third z coordinate three-dimensional geometry value, wherein the third z coordinate three-dimensional geometry value is subtracted from depth values of the one or more regions so that the depth values no longer have a common value with the three-dimensional object; and reconstructing a volumetric video by adjusting geometry region values based on the decoded signal.

18. An apparatus comprising at least one processor and at least one non-transitory memory, said at least one memory including computer program code, the at least one memory and the computer program code configured to, with the at least one processor, cause the apparatus at least to:

receive a bitstream;

decode from a bitstream a signal indicating at least one of the following:

an intra frame offset relating to a first z coordinate three-dimensional geometry value between two regions within a frame, the intra frame offset configured to be used to adjust the first z coordinate three-dimensional geometry value of a geometry region within the frame with applying the intra frame offset to the first z coordinate three-dimensional geometry value of the geometry region within the frame;

an inter frame offset relating to a second z coordinate three-dimensional geometry value between two patches in different frames, the inter frame offset configured to be used to adjust the second z coordinate three-dimensional geometry value of a geometry patch in a different frame with applying the inter frame offset to the second z coordinate three-dimensional geometry value of the geometry patch in the different frame;

a depth smoothness constraint relating to a third z coordinate three-dimensional geometry value, wherein the third z coordinate three-dimensional geometry value is subtracted from depth values of the one or more regions so that the depth values no longer have a common value with the three-dimensional object; and reconstruct a volumetric video by adjusting geometry region values based on the decoded signal.

19. The method of claim 1, further comprising:
inserting into the bitstream or signaling along a bitstream a patch offset index configured to be used to determine an offset value of a reference patch;
wherein the offset value of the reference patch is configured to be used to adjust the first z coordinate three-dimensional geometry value of the geometry region within the frame, or the second z coordinate three-dimensional geometry value of the geometry patch in the different frame.

20. The method of claim 1, further comprising predicting the intra frame offset or the inter frame offset from patch metadata.

21. The method of claim 1, further comprising:
determining the intra frame offset with one or a combination of the following:
a difference in mean value between two patches;
a difference in median value between two patches;
a difference in closest pixel values; or
calculating for a patch edge pixel a delta depth between the edge pixel and a closest neighboring patch edge, and determining new depth offsets for a patch that stabilizes depth values for a full frame; and
determining the inter frame offset with one or a combination of the following:
a difference in mean value between a current patch and pixel values of a respective location of the current patch in a reference image; or
a difference in median value between the current patch and the pixel values of the respective location of the current patch in the reference image.

22. The method of claim 1, further comprising:
collecting the depth values for a group of frames; and
subtracting the third z coordinate three-dimensional geometry value from the depth values for the group of frames.

23. The apparatus of claim 9, wherein the signal inserted into the bitstream or signaled along the bitstream indicating the intra frame offset or the inter frame offset comprises auxiliary patch metadata having at least one syntax element.

24. A non-transitory computer-readable medium comprising program instructions stored thereon which are configured to, when executed with at least one processor, cause the at least one processor to perform the method of claim 1.

25. A non-transitory computer-readable medium comprising program instructions stored thereon which are configured to, when executed with at least one processor, cause the at least one processor to perform the method of claim 17.

* * * * *